(12) United States Patent
Lemmons (10) Patent No.: US 9,113,182 B2
(45) Date of Patent: *Aug. 18, 2015

(54) SELECTING A MEDIA CONTENT SOURCE BASED ON MONETARY COST

(71) Applicant: Wowza Media Systems, LLC, Evergreen, CO (US)

(72) Inventor: Thomas R. Lemmons, Evergreen, CO (US)

(73) Assignee: WOWZA MEDIA SYSTEMS, LLC, Golden, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/096,961

(22) Filed: Dec. 4, 2013

(65) Prior Publication Data

US 2015/0156525 A1    Jun. 4, 2015

(51) Int. Cl.
H04N 21/2543    (2011.01)

(52) U.S. Cl.
CPC ................. *H04N 21/2543* (2013.01)

(58) Field of Classification Search
CPC .......... H04N 21/323; H04N 21/23103; H04N 21/23116; H04N 21/232; H04N 21/2384; H04N 21/2387; H04N 21/2393; H04N 21/24; H04N 21/2402; H04N 21/442; H04N 21/44209; H04N 21/238; H04N 21/2385; H04N 21/2543; H04N 21/26216; H04N 21/26225; H04N 21/6338; H04N 21/64723; H04N 21/64738; H04L 12/4641; H04L 45/306; H04L 29/06455; H04L 29/0653; H04L 29/08972; H04L 29/12009; H04L 65/4076; H04L 67/327; H04L 69/22
USPC ............... 725/86–87, 91, 95, 96, 98–99, 103, 725/105, 109, 114, 117–120, 143–144; 709/217, 231, 223–226, 227–229
See application file for complete search history.

(56) References Cited

U.S. PATENT DOCUMENTS 6,185,598 B1 *   2/2001   Farber et al. ................. 709/200
6,275,470 B1    8/2001   Ricciulli
(Continued)

FOREIGN PATENT DOCUMENTS

WO            0223362 A1      3/2002
WO         2012167106 A1     12/2012
WO         2013034200 A1      3/2013

OTHER PUBLICATIONS

Z. Mao et al.; "Network Support for Mobile Multimedia Using a Self-adaptive Distributed Proxy"; University of California at Berkeley, Berkeley, CA; NOSSDAV'01, Jun. 25-27, 2001; accessed Oct. 11, 2013 from web.eecs.umich.edu/~zmao/Papers/nossdav.pdf.

(Continued)

*Primary Examiner* — Hai V Tran
(74) *Attorney, Agent, or Firm* — Toler Law Group, PC (57) ABSTRACT

Systems and methods of selecting a media content source based on monetary cost are disclosed. A particular method includes receiving media content at a network device and sending the media content from the network device to each of a plurality of source devices configured to provide the media content to a destination device. The method further includes receiving a request for the media content from the destination device and selecting a first source device of the plurality of source devices to provide the media content to the destination device based at least in part on a determination that a first monetary cost associated with providing the media content from the first source device is less than a second monetary cost associated with providing the media content from a second source device of the plurality of source devices.

17 Claims, 8 Drawing Sheets

(56) References Cited

U.S. PATENT DOCUMENTS

| | | |
|---|---|---|
| 6,751,673 B2 | 6/2004 | Shaw |
| 6,785,704 B1* | 8/2004 | McCanne ............... 718/105 |
| 8,169,916 B1* | 5/2012 | Pai et al. ............... 709/226 |
| 8,281,035 B2* | 10/2012 | Farber et al. ............... 709/245 |
| 8,422,376 B2* | 4/2013 | Raciborski et al. ........... 370/237 |
| 2002/0028656 A1 | 3/2002 | Yemini et al. |
| 2004/0076154 A1* | 4/2004 | Mizutani et al. ............. 370/389 |
| 2004/0210670 A1* | 10/2004 | Anerousis et al. ............ 709/238 |
| 2005/0271150 A1* | 12/2005 | Moore et al. ............... 375/259 |
| 2006/0015574 A1* | 1/2006 | Seed et al. ............... 709/219 |
| 2006/0112143 A1 | 5/2006 | Subramanian |
| 2008/0080473 A1 | 4/2008 | Thubert et al. |
| 2009/0144412 A1* | 6/2009 | Ferguson et al. ............ 709/224 |
| 2011/0078230 A1 | 3/2011 | Sepulveda |
| 2012/0099589 A1 | 4/2012 | Kato |
| 2012/0113810 A1 | 5/2012 | Brown |
| 2013/0010797 A1 | 1/2013 | Brandwine et al. |
| 2013/0268961 A1* | 10/2013 | Miles et al. ............... 725/32 |
| 2014/0052825 A1* | 2/2014 | Luecke et al. ............... 709/219 |
| 2014/0098685 A1* | 4/2014 | Shattil ............... 370/252 |

OTHER PUBLICATIONS

Smith et al.; "SELECTING_YOUR_CLOUDS"; Gartner Headquarters, Stamford, CT; Dec. 4, 2012; accessed Oct. 11, 2013 from https://www.ntt-global.com/downloads/SELECTING_YOUR_CLOUDS.pdf.

N. Venkatasubramanian et al.; "Effective Load Management for Scalable Video Servers"; Broadband Information Systems Lab, HP Laboratories, Palo Alto, CA; Sep. 12, 1996; accessed Oct. 11, 2013 from http://citeseerx.ist.psu.edu/viewdoc/summary?doi=10.1.1.42.9258.

* cited by examiner

SELECTING A MEDIA CONTENT SOURCE BASED ON MONETARY COST

BACKGROUND

The popularity of the Internet, coupled with the increasing capabilities of personal/mobile electronic devices, has provided consumers with the ability to enjoy multimedia content almost anytime and anywhere. For example, live (e.g., sports events) and video on demand (VOD) content (e.g., television shows and movies) can be streamed via the Internet to personal electronic devices (e.g., computers, mobile phones, and Internet-enabled televisions).

In a client-server system, a server may provide a multimedia stream to each client device that requests the stream. However, providing multiple copies of the stream may exhaust available bandwidth at the server. To alleviate the demand on the server, the stream may be syndicated to multiple servers and made available from any of the servers. A load balancing system may be utilized to determine which particular server should provide a stream to a particular destination device.

SUMMARY

Systems and methods of selecting a multimedia content source based on monetary cost are disclosed. Upon receiving a media stream, a network device may syndicate (e.g., distribute in replicated fashion) the media stream to multiple source devices. The source devices may be part of different media delivery networks. Each media delivery network may have a different billing system that varies depending on a time of day, a day of the week, a number of simultaneous viewers, bandwidth in use, etc. Thus, in terms of monetary cost to a content provider, a different source device and media delivery network may represent a "lowest cost" source for a media stream at any particular time.

In accordance with the described techniques, sourcing (e.g., source selection) logic, such as a rules engine that operates based on stored sourcing/billing criteria, may be implemented (e.g., installed) at the network device and/or the source devices of one or more media delivery networks. For example, such sourcing logic may be implemented at load-balancing servers, network switches, gateways, internet service provider (ISP) servers, content delivery network (CDN) servers, etc. When the network device receives a request from a destination device from the media stream, the sourcing logic may identify a particular source device that should provide the media stream (or packet(s) thereof) to the destination device so as to reduce or minimize the overall monetary cost associated with providing the media stream (or packet(s) thereof) to the destination device.

In some scenarios, the source device/media delivery network that represents the "lowest cost" source change in the middle of a stream. For example, the "lowest cost" source may be Network A at 6:59 pm but may be Network B at 7:00 pm, because Network B may have a lower cost than Network A after 7 pm. Advantageously, the described techniques enable switching from using a source device in Network A at 6:59 pm to using a source device in Network B at 7:00 pm without interrupting playback of the streaming multimedia content at the destination device. For example, even though different networks may be used to provide the packets of the stream to the destination device, and packets may arrive out of order, the packets may be buffered and reordered at the destination device without interrupting playback of the stream.

The described systems and methods may thus enable multimedia content providers and distributors to dynamically identify and use a "lowest cost" source to provide media content to a destination device, including dynamic switching between sources mid-stream without impacting user enjoyment of a media stream.

DETAILED DESCRIPTION

Figure 1:
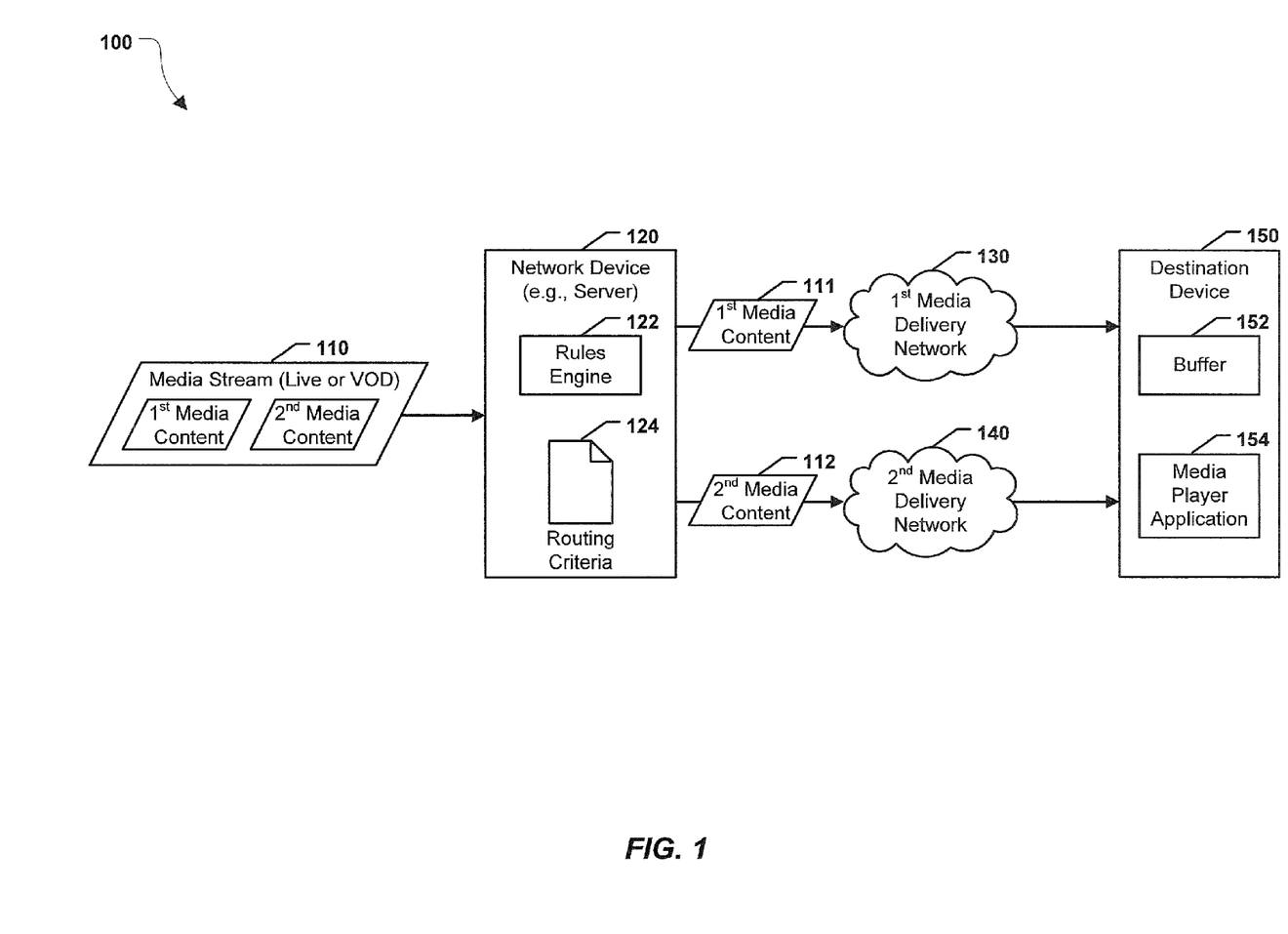
FIG. 1 is a diagram of a particular embodiment of a system that is operable to route media content based on monetary cost.

FIG. 1 is a diagram of a particular embodiment of a system 100 that is operable to route media content based on monetary cost. The system 100 includes a network device 120 and a destination device 150, each of which may be communicably coupled to one or more media delivery networks, such as a local area network (LAN), a wide area network (WAN), a public access network, a private access network, a content distribution network (CDN), an internet service provider (ISP) network, the internet, an internet hosting service, a cloud service provider network, and/or a wireless service (e.g., 3G or 4G) provider network. The destination device 150 may be a mobile telephone, a computing device (e.g., a laptop computer, a desktop computer, or a tablet computer), a television, a set-top box, a game console, a portable media player, or another device capable of media playback.

In a particular embodiment, the network device 120 is a server that is configured to send and receive data, such as a media stream 110. For example, the network device 120 may be a media server, as further described with reference to FIG. 8. The media stream 110 may include audio content, video content, graphics content, text content, or any combination thereof. For example, the media stream 110 may be a live stream or a video-on-demand (VOD) stream. The media stream 110 may be received from another network device, such as a live stream capture device, or the media stream 110 may be received from a storage device connected to the network device 120. The media stream 110 may be divided into multiple "chunks," "portions," "segments," or "pieces" that are individually routable. For example, in FIG. 1, the media stream 110 includes first media content 111 and second media content 112, each of which may correspond to one or more distinct data packets. In a particular embodiment, the first media content 111 corresponds to a first adaptive bitrate rendition (ABR) chunk and the second media content 112 corresponds to a second ABR chunk, as further described with reference to FIG. 8.

The network device 120 may include a rules engine 122 and routing criteria 124. The routing criteria 124 may indicate monetary prices or pricing schemes associated with routing data through each of a plurality of media delivery networks available to the network device 120. In a particular embodiment, the routing criteria 124 is stored in a database and/or a file (e.g., an extensible markup language (XML) file). In FIG. 1, the network device 120 is connected to a first media delivery network 130 and to a second media delivery network 140. Thus, the routing criteria 124 may indicate how much it would cost to route the media stream 110 (or components thereof, such as the first media content 111 or the second media content 112) to the destination device 150 via the first media delivery network 130 or the second media delivery network 140. An example of the routing criteria 124 is further described with reference to FIG. 5.

The rules engine 122 may correspond to hardware and/or software at the network device 120 that is configured to evaluate the routing criteria 124 and to determine which available network is the lowest-cost network to route the media stream 110 (or portions thereof). For example, at a particular point in time, the network device 120 may be exhibit one or more operating conditions. Operating conditions at a particular point in time may include, but are not limited to, a time of day, a day of the week, how much data has previously been routed through a media delivery network during a particular time period (e.g., a day, a month, etc.), how many simultaneous streaming connections are being supported by a network, an available individual connection bandwidth, etc.

During operation, the rules engine 122 may compare the operating conditions with the routing criteria 124 to determine whether a first monetary cost associated with routing the media stream 110 to the destination device 150 through the first media delivery network 130 is greater than or less than a second monetary cost associated with routing the media stream 110 to the destination device 150 through the second media delivery network 140. The network device 120 may select the lower cost media delivery network 130 or 140 and may route the media stream 110 to the destination device 150 via the selected media delivery network 130 or 140.

In a particular embodiment, which media delivery network 130 or 140 is "lowest cost" may change while the media stream 110 is ongoing. For example, the first monetary cost may initially be lower than the second monetary cost, and the first media content 111 may be routed through the first media delivery network 130, as shown. The rules engine 122 may reevaluate the routing criteria 124 periodically, on a chunk-by-chunk basis, in response to an event, in response to user input, or any combination thereof. Thus, when it is time to route the second media content 112 to the destination device 150, the rules engine 122 may determine that the first monetary cost exceeds the second monetary cost (e.g., the first monetary has increased and/or the second monetary cost has decreased due to a change in applicable pricing tier, time of day, etc.). In response to the change in pricing, the network device 120 may route the second media content 112 to the destination device 150 through the second media delivery network 140 instead of through the first media delivery network 130. During transmission of the media stream 110, multiple such routing switches may be performed, depending on whether and how much the monetary costs associated with the routing fluctuates.

Dynamically switching routing of the media stream 110 from the first media delivery network 130 to the second media delivery network 140 may be performed without interrupting playback of the media stream 110 at the destination device 150. To illustrate, the destination device 150 may include a media player application 154 that accesses a local buffer 152 to play (e.g., render) the media stream 110. Each portion of the media stream 110 (e.g., the first media content 111 and the second media content 112) may include an indication of its place within the media stream 110 (e.g., a packet number, a chunk identifier (ID), etc.). Switching routing from the first media delivery network 130 to the second media delivery network 140 may be performed without interrupting playback of the media stream 110 at the destination device 150 by providing (e.g., via quality of service (QoS) mechanisms) the second media content 112 to the buffer 152 before playback of the first media content 111 is completed.

The system 100 of FIG. 1 may thus enable multimedia content providers and distributors to dynamically identify and use a "lowest cost" routing path to a destination device. For example, a content provider or distributor may use the system 100 of FIG. 1 to dynamically provide live or VOD streams to viewers while reducing bandwidth costs. As another example, a network service provider may use the system 100 of FIG. 1 to dynamically route live or VOD streams between servers within an internal network. The system 100 may support dynamically switching between routing paths mid-stream without impacting user enjoyment of the media stream at the destination device.

Figure 2:
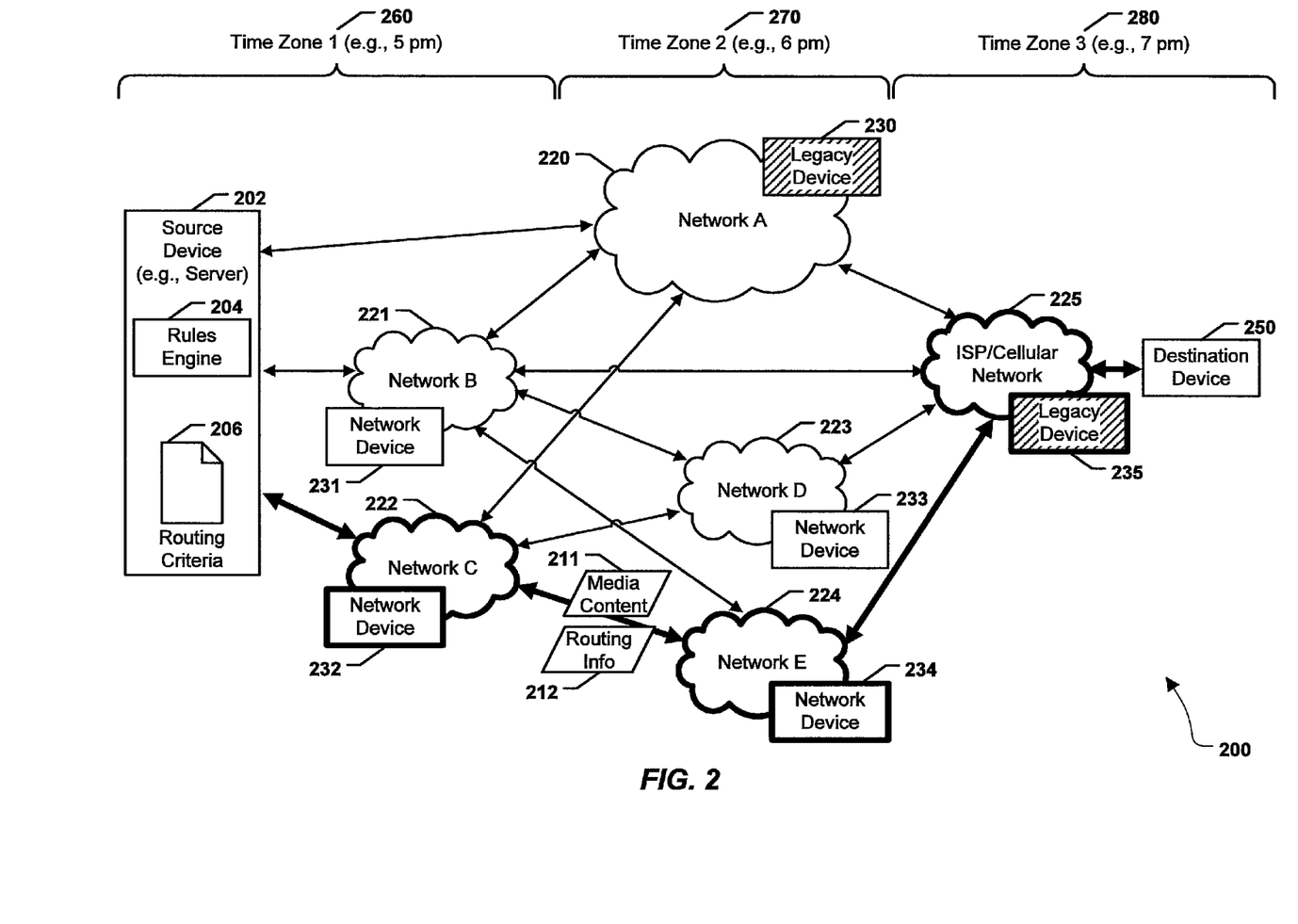
FIG. 2 is a diagram of another particular embodiment of a system that is operable to route media content based on monetary cost.

FIG. 2 is a diagram of another particular embodiment of a system 200 that is operable to route media content based on monetary cost. The system 200 includes a source device 202 and a destination device 250.

Various media delivery networks are present between the source device 202 and the destination device 250. In FIG. 2, a first media delivery network ("Network A") 220, a second media delivery network ("Network B") 221, a third media delivery network ("Network C") 222, a fourth media delivery network ("Network D") 223, a fifth media delivery network ("Network E"), and a sixth media delivery network 225 are shown. The media delivery networks 220-225 may each generally be internet hosting services, CDNs, cloud service provider networks, ISP networks, wireless service provider networks, etc. The sixth media delivery network 225 may represent a "closest" access network for the destination device 250. For example, the sixth media delivery network 225 may be an ISP network or a cellular network. Each media delivery network 220-225 may include one or more corresponding network devices 230-235, such as network servers, load balancing servers, gateways, routers, switches, etc.

In a particular embodiment, routing logic to implement dynamic routing based on monetary cost, as described with reference to FIG. 1, may be implemented (e.g., installed) on devices within one or more of the media delivery networks 220-225. For example, in FIG. 2, the rules engine 122 and the routing criteria 124 of FIG. 1 may be available at the network devices 231, 232, 233, and 234. A rules engine 204 and routing criteria 206 are also available at the source device 202. Because the dynamic routing is not available at the networks 220 and 225, the devices 230 and 235 may be considered "legacy" devices, which are visually illustrated in FIG. 2 using a hatched pattern.

Various devices and networks illustrated in FIG. 2 may be located in different time zones. In FIG. 2, three illustrative time zones 260, 270, and 280 are shown. It should be noted that in alternate embodiments, more or fewer time zones, networks, and/or devices may be available to form a routing path between the source device 202 and the destination device 250.

During operation, the destination device 250 may request media content 211 (e.g., a media stream) from the source device 202. In a first embodiment, responsive to the request, the rules engine 204 of the source device 202 may evaluate routing criteria 206 to determine whether to route the media content 211 through Network A 220, Network B 221, or Network C 222. The determination of which network to route the media content 211 through may depend on various factors, including but not limited to the time of day/time zone at each of the networks. In the example of FIG. 2, the source device 202 selects Network C 222, and the selection is visually illustrated in FIG. 2 using thickened/bold lines.

Upon receiving the media content 211 from the source device 202, the network device 232 (which is not a legacy device) may similarly determine whether to continue routing the media content 211 to the destination device 250 via Network A 220, Network D 223, or Network E 224. In the illustrated example, Network C routes the media content 211 to Network E 224 in response to determining that Network E 224 has a lower cost than Network A 220 and Network D 223. Routing continues from Network E to the ISP/Cellular network 225, and from the ISP/Cellular network 225 to the destination device 250, as shown.

In a particular embodiment, each of the devices illustrated in FIG. 2 determines a "next" point on the route to the destination device. Alternately, a device may determine and/or modify any point on the route. To illustrate, routing the media content 211 from a first device to a second device may include transmitting routing information 212 along with the media content 211. In the illustrated example, the source device 202 may determine an end-to-end routing path "Source Device→Network C→Network E→ISP/Cellular Network→Destination Device." The source device 202 may transmit routing information 212 identifying the end-to-end routing path along with the media content 211. For example, such routing information 212 may be transmitted as in-stream data (e.g., metadata in a packet header) or in a command stream (e.g., sideband channel) distinct from the media content 211. At each non-legacy device in the routing path, the device may verify that the previously determined end-to-end routing path is still the lowest-cost path. If not, the device may modify the end-to-end routing path (e.g., by modifying metadata or command stream data) and routing may continue in accordance with the modified routing information 212.

It should be noted that because the device 235 is a legacy device, the routing from the ISP/Cellular network 225 to the destination device 150 may be performed without regard to monetary cost. Similarly, if Network A were present in the routing path between the source device 202 and the destination device 250, the legacy device 230 would route the media content 211 to a "next" destination without regard to monetary cost. Once the media content arrives at a network device capable of performing dynamic routing in accordance with the present disclosure, dynamic routing based on monetary cost may once again be performed.

The system 200 of FIG. 2 thus enables routing based on monetary cost, including paths that include one or more "legacy" devices. Thus a staggered roll-out of the described dynamic routing method may be performed.

Figure 3:
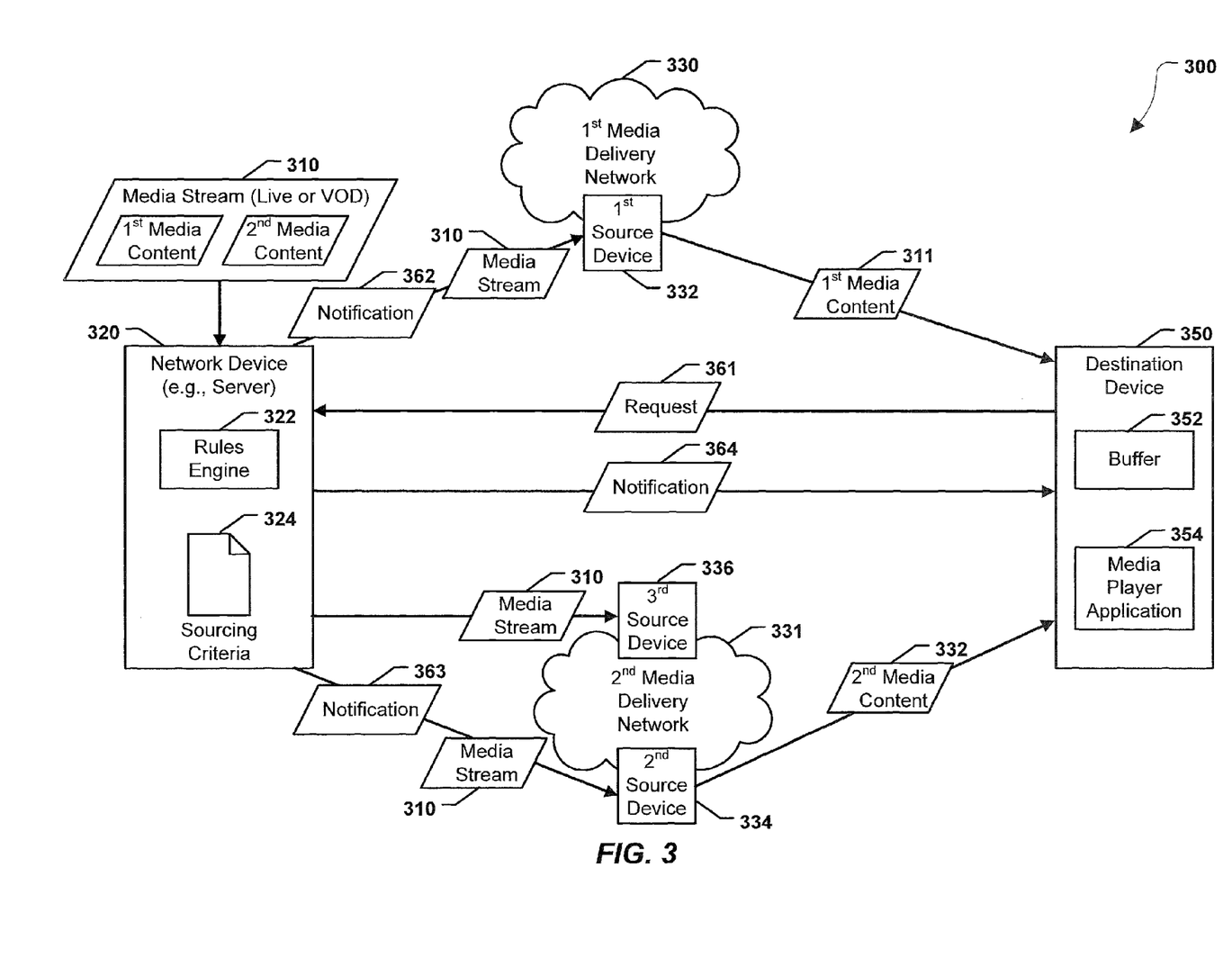
FIG. 3 is a diagram of a particular embodiment of a system that is operable to select a media content source based on monetary cost.

While the foregoing describes routing media content based on monetary cost, the described systems and methods may also, or in the alternative, select a media content source based on monetary cost. For example, FIG. 3 is a diagram of a particular embodiment of a system 300 that is operable to select a media content source based on monetary cost. The system 300 includes a network device 320 and a destination device 350, each of which may be communicably coupled to one or more media delivery networks, such as a local area network (LAN), a wide area network (WAN), a public access network, a private access network, a content distribution network (CDN), an internet service provider (ISP) network, the internet, an internet hosting service, a cloud service provider network, and/or a wireless service (e.g., 3G or 4G) provider network. The destination device 350 may be a mobile telephone, a computing device (e.g., a laptop computer, a desktop computer, or a tablet computer), a television, a set-top box, a game console, a portable media player, or another device capable of media playback.

In a particular embodiment, the network device 320 is a server that is configured to send and receive data, such as a media stream 310. For example, the network device 320 may be a media server, as further described with reference to FIG. 8. The media stream 310 may include audio content, video content, graphics content, text content, or any combination thereof. For example, the media stream 310 may be a live stream or a video-on-demand (VOD) stream. The media stream 310 may be received from another network device, such as a live stream capture device, or the media stream 310 may be received from a storage device connected to the network device 320. The media stream 310 may be divided into multiple "chunks," "portions," "segments," or "pieces" that are individually routable. For example, in FIG. 3, the media stream 310 includes first media content 311 and second media content 312, each of which may correspond to one or more distinct data packets. In a particular embodiment, the first media content 311 corresponds to a first adaptive bitrate rendition (ABR) chunk and the second media content 312 corresponds to a second ABR chunk, as further described with reference to FIG. 8.

The network device 320 may include a rules engine 322 and sourcing criteria 324. The sourcing criteria 324 may indicate monetary prices or pricing schemes associated with providing data via each of a plurality of media delivery networks available to the network device 320. In a particular embodiment, the sourcing criteria 324 is stored in a database and/or a file (e.g., an extensible markup language (XML) file). In FIG. 3, the network device 320 is connected to a first media delivery network 330 and to a second media delivery network 331. Thus, the sourcing criteria 324 may indicate how much it would cost to provide the media stream 310 (or components thereof, such as the first media content 311 or the second media content 312) to the destination device 350 from the first media delivery network 330 (or a device therein, such as an illustrative source device 332) or the second media delivery network 331 (or a device therein, such as illustrative source devices 334 and 336). An example of the sourcing criteria 324 is further described with reference to FIG. 5.

The rules engine 322 may correspond to hardware and/or software at the network device 320 that is configured to evaluate the sourcing criteria 324 and to determine which available network (or source device therein) is the lowest-cost source to provide the media stream 310 (or portions thereof) to the destination device 350. For example, upon receiving the media stream 310, the network device 320 may syndicate (e.g., transmit in replicated fashion) the media stream 310 to each of the source devices 332-336. At a particular point in time, the network device 320 may exhibit or be associated with one or more operating conditions. Operating conditions at a particular point in time may include, but are not limited to, a time of day, a day of the week, how much data has previously been provided to destination devices from a particular network or source device during a particular time period (e.g., a day, a month, etc.), how many simultaneous streaming connections are being supported by a network or source device, available individual connection bandwidth, etc.

During operation, the network device 320 may transmit the media stream 310 to each of the source devices 332-336. The network device 320 may receive a request 361 for the media stream 310 from the destination device 350. In response to the request 361, the rules engine 322 may compare current operating conditions with the sourcing criteria 324 to determine which of the source devices 332-336 has the lowest monetary cost associated with providing the requested media stream 310 to the destination device 350. The network device 320 may select the lowest cost source device 332-336 and may transmit a notification regarding the lowest cost source device. For example, the network device 320 may transmit a notification 362 to the first source device 332 instructing the first source device 332 to provide the media stream 310 to the destination device 350. Alternately, or in addition, the network device 320 may transmit a notification 364 to the destination device 350 instructing the destination device 350 to request the media stream 310 from the first source device 332.

In a particular embodiment, which network 330 or 331 (or source device 332-336) is the "lowest cost" media content source may change while the media stream 310 is ongoing. For example, because a first monetary cost associated with the first source device 332 is initially lower than a second monetary cost associated with the second source device 334, the first media content 311 may be provided by the first source device 332, as shown. The rules engine 322 may reevaluate the sourcing criteria 324 periodically, on a chunk-by-chunk basis, in response to an event, in response to user input, or any combination thereof. Thus, when it is time to provide the second media content 312 to the destination device 350, the rules engine 322 may determine that the first monetary cost now exceeds the second monetary cost (e.g., the first monetary has increased and/or the second monetary cost has decreased due to a change in applicable pricing tier, time of day, etc.). In response to the change in pricing, the network device 320 may select the second source device 334 to provide the second media content 312 to the destination device 350. The network device 320 may send a notification 363 to the second source device 334 and/or a notification 364 to the destination device 350 that the second source device 334 has been selected to provide the second media content 312. During transmission of the media stream 310, multiple such switches of source devices may be performed, depending on whether and how much the monetary costs associated with providing the media stream 310 fluctuates.

Dynamically switching providing of the media stream 310 between networks and source devices may be performed without interrupting playback of the media stream 310 at the destination device 350. To illustrate, the destination device 350 may include a media player application 354 that accesses a local buffer 352 to play (e.g., render) the media stream 310. Each portion of the media stream 310 (e.g., the first media content 311 and the second media content 312) may include an indication of its place within the media stream 310 (e.g., a packet number, a chunk identifier (ID), etc.). Switching from providing the media stream 310 from one network to another or from one source device to another may be performed without interrupting playback of the media stream 310 at the destination device 350 by providing (e.g., via quality of service (QoS) mechanisms) the second media content 312 to the buffer 352 before playback of the first media content 311 is completed.

The system 300 of FIG. 3 may thus enable multimedia content providers and distributors to syndicate media content to multiple sources and to dynamically identify and use a "lowest cost" source to provide the media content to a destination device. For example, a content provider or distributor may use the system 300 of FIG. 3 to dynamically identify a source for a live or VOD stream to a viewer while reducing bandwidth costs. The system 300 may support dynamically switching between sources mid-stream without impacting user enjoyment of the media stream at the destination device.

Figure 4:
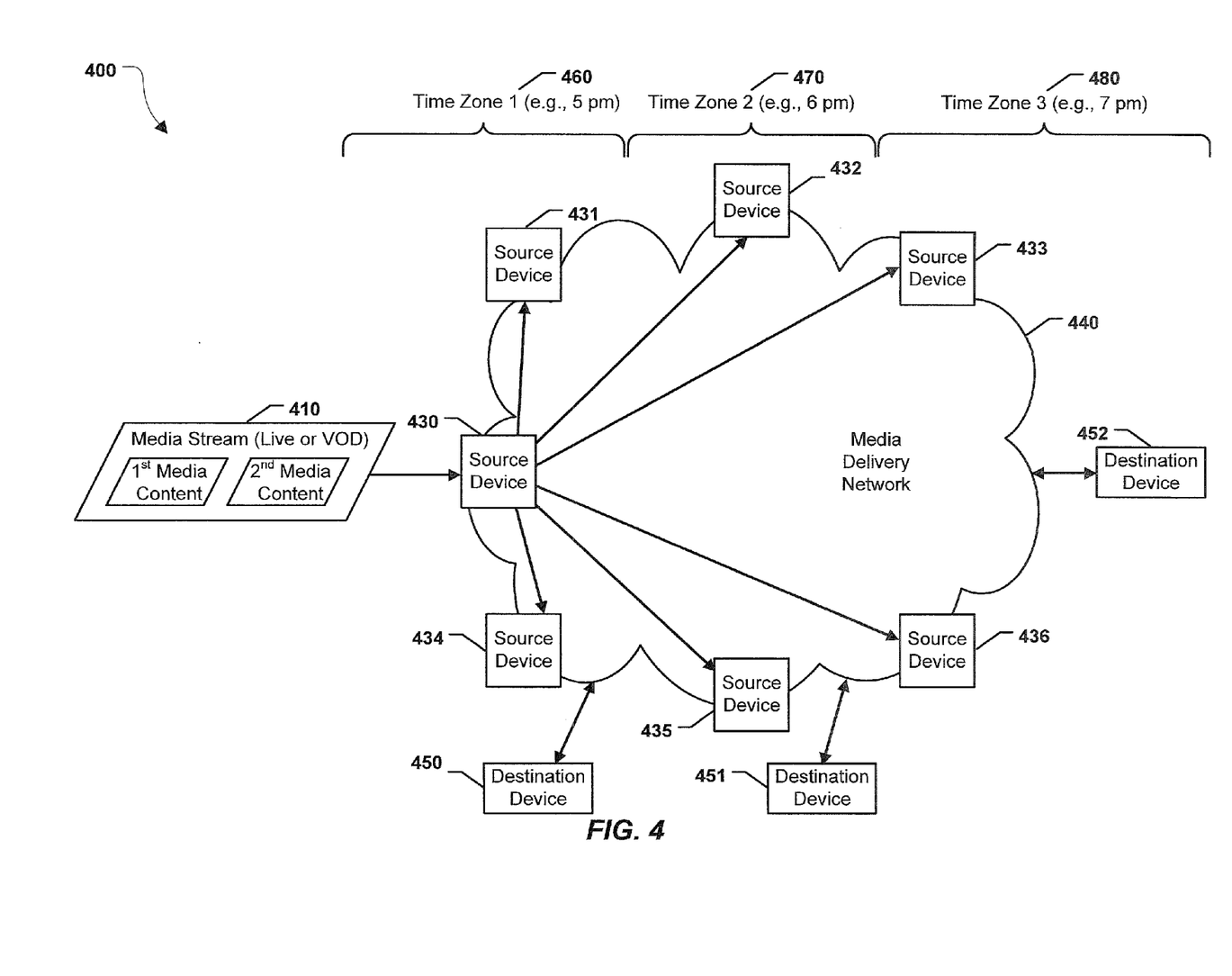
FIG. 4 is a diagram of another particular embodiment of a system that is operable to select a media content source based on monetary cost.

FIG. 4 is a diagram of another particular embodiment of a system 400 that is operable to select a media content source based on monetary cost. The system 400 includes a plurality of source devices 430, 431, 432, 433, 434, 435, and 436, where each of the source devices 430-436 is part of the same media delivery network 440 (e.g., associated with a common service provider). The system 400 also includes a plurality of destination devices 450, 451, and 452 that are configured to receive a media stream 410 from any of the source devices 430-436 via the media delivery network 440.

The media delivery network 440 may be an internet hosting service, a content delivery network (CDN), a cloud service provider network, an ISP network, a wireless service provider network, etc. The source devices 431-436 may be configured to provide data to destination devices and may include one or more network servers, load balancing servers, gateways, routers, switches, etc.

In a particular embodiment, sourcing logic to implement dynamic selection of a media content source based on monetary cost, as described with reference to FIG. 3, may be implemented (e.g., installed) on devices within the media delivery network 440. For example, each of the source devices 430-436 may include or have access to the rules engine 322 and the sourcing criteria 324 of FIG. 3. Further, different source devices 430-436 may be located in different time zones. In FIG. 4, three illustrative time zones 460, 470, and 480 are shown. It should be noted that in alternate embodiments, more or fewer time zones, networks, and/or devices may be available to provide the media stream 410 to the destination device 450.

During operation, the media delivery network 440 may receive the media stream 410. In the illustrated example, the media stream is received by the source device 430. The source device 430 may syndicate the media stream 410 to the remaining source devices 431-436, so that any of the source devices 430-436 is capable of providing the media stream 410 to any of the destination devices 450-452. When one of the destination devices 450-452 requests the media stream 410, sourcing logic within the media delivery network 440 may select a particular one of the source devices 430-436 to provide the media stream 410 to the destination device. The sourcing logic may be present at one or more of the source devices 430-436 and/or at a separate load balancing server. The determination of which source device 430-436 should provide the media stream 410 may depend on various factors including, but not limited to, the time of day/time zone at each of the source devices 430-436, as further described with reference to FIG. 5.

The system 400 of FIG. 4 thus enables syndicating content to multiple "edge" servers of a media delivery network and dynamically selecting a particular one of the "edge" servers to provide a media stream based on monetary cost.

Figure 5:
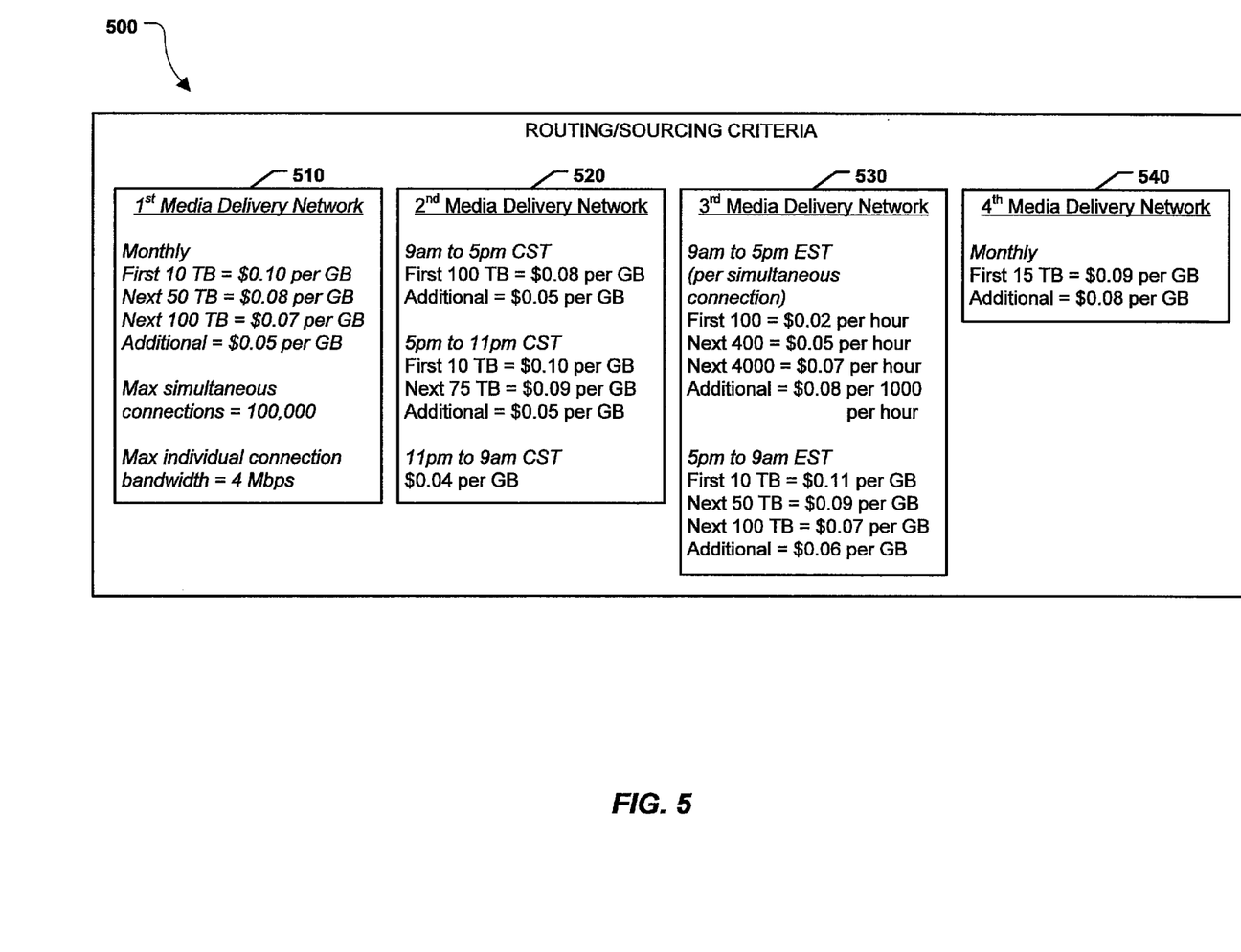
FIG. 5 is a diagram of an illustrative embodiment of routing criteria that may be used by the systems of FIGS. 1-2 and sourcing criteria that may be used by the systems of FIGS. 3-4.

FIG. 5 is a diagram of an illustrative embodiment of routing and sourcing criteria 500 that may be used in conjunction with routing media content based on monetary cost. For example, the criteria 500 may be used as or may correspond to the routing criteria 124 of FIG. 1, the routing criteria 206 of FIG. 2, and/or the sourcing criteria 324 of FIG. 3. It should be noted that although FIG. 5 illustrates common routing and sourcing criteria, in alternate embodiments routing criteria and sourcing criteria may differ and may be stored independently.

The criteria 500 may indicate monetary costs and pricing tiers/schemes associated with a plurality of media delivery networks. For example, the criteria 500 includes first criteria 510 for a first network, second criteria 520 for a second network, third criteria 530 for a third network, and fourth criteria 540 for a fourth network. In alternate embodiments, criteria for more or fewer networks may be indicated. Moreover, it should be noted that although FIG. 5 illustrates sourcing criteria on a per network basis, in alternate embodiments sourcing criteria may also vary on a per source device basis, including varying between source devices of the same media delivery network.

The first criteria 510 for the first network indicates variation in price based on the amount of data routed through or provided by the first network. For example, on a monthly basis, the first 10 terabytes (TB) routed through or provided by the first network is priced at $0.10 per gigabyte (GB). The next 50 TB (i.e., from 11 TB to 60 TB) is priced at $0.08 per GB. The next 100 TB is priced at $0.07 per GB, and any additional data is priced at $0.05 per GB. The first criteria 510 also indicates a limit of a number of simultaneous connections to 100,000. Thus, the first network may not support more than 100,000 simultaneous viewers of a media stream. The first criteria 510 also indicates a limit of the bandwidth of any individual connection to 4 megabits per second (Mbps), which may cause selection of an alternate network in the case of media streams having a bandwidth greater than 4 Mbps (e.g., high-definition streams or ultra-high-definition streams).

The second criteria 520 for the second network indicates variation in price based on an amount of data transferred through or provided by the second network and based on time of day. Between 9 am and 5 pm central standard time (CST), the first 100 TB is priced at $0.08 per GB and additional data is priced at $0.05 per GB. Between 5 pm and 11 pm CST, the first 10 TB is priced at $0.10 per GB, the next 75 TB is priced at $0.09 per GB, and additional data is priced at $0.05 per GB. Between 11 pm and 9 am CST, a price of $0.04 per GB is applied.

The third criteria 530 for the third network indicates variation in price based on connection duration, an amount of data transferred or provided, time of day, and/or number of simultaneous connections (e.g., stream viewers). From 9 am to 5 pm CST, up to 100 simultaneous connections costs $0.02 per hour, up to 400 additional simultaneous connections costs $0.05 per hour, up to 4000 additional simultaneous connections costs $0.07 per hour, and each additional set of 1000 simultaneous connections costs $0.08 per hour. From 5 pm to 9 am CST, the first 10 TB of data costs $0.11 per GB, the next 50 TB costs $0.09 per GB, the next 100 TB costs $0.07 per GB, and additional data costs $0.06 per GB.

The fourth criteria 540 for the fourth network indicates variation in price based on an amount of data transferred through or provided by the fourth network. On a monthly basis, the first 15 TB of data costs $0.09 per GB and additional data costs $0.08 per GB.

Based on the criteria 500, dynamic routing logic (e.g., the rules engine 122 of FIG. 1, the rules engine 204 of FIG. 2) may determine which network to route media content through. Alternatively, or in addition, dynamic sourcing logic (e.g., the rules engine 322 of FIG. 3) may determine which network (or source device thereof) is to provide media content to a destination device. The determinations may be made in view of operating conditions that may include, but are not limited to, time of day at a network, amount of data to be routed through or provided by a network, amount of data previously routed through or provided by a network (e.g., in a particular month), number of simultaneous connections (e.g., stream viewers), and stream bandwidth. As operating conditions change, different networks may be determined to be the "lowest cost" available network. It should be noted that the specific criteria illustrated in FIG. 5 is an example only and is not to be considered limiting. In alternate embodiments, routing criteria, sourcing criteria, and monetary pricing may vary based on other factors.

Figure 6:
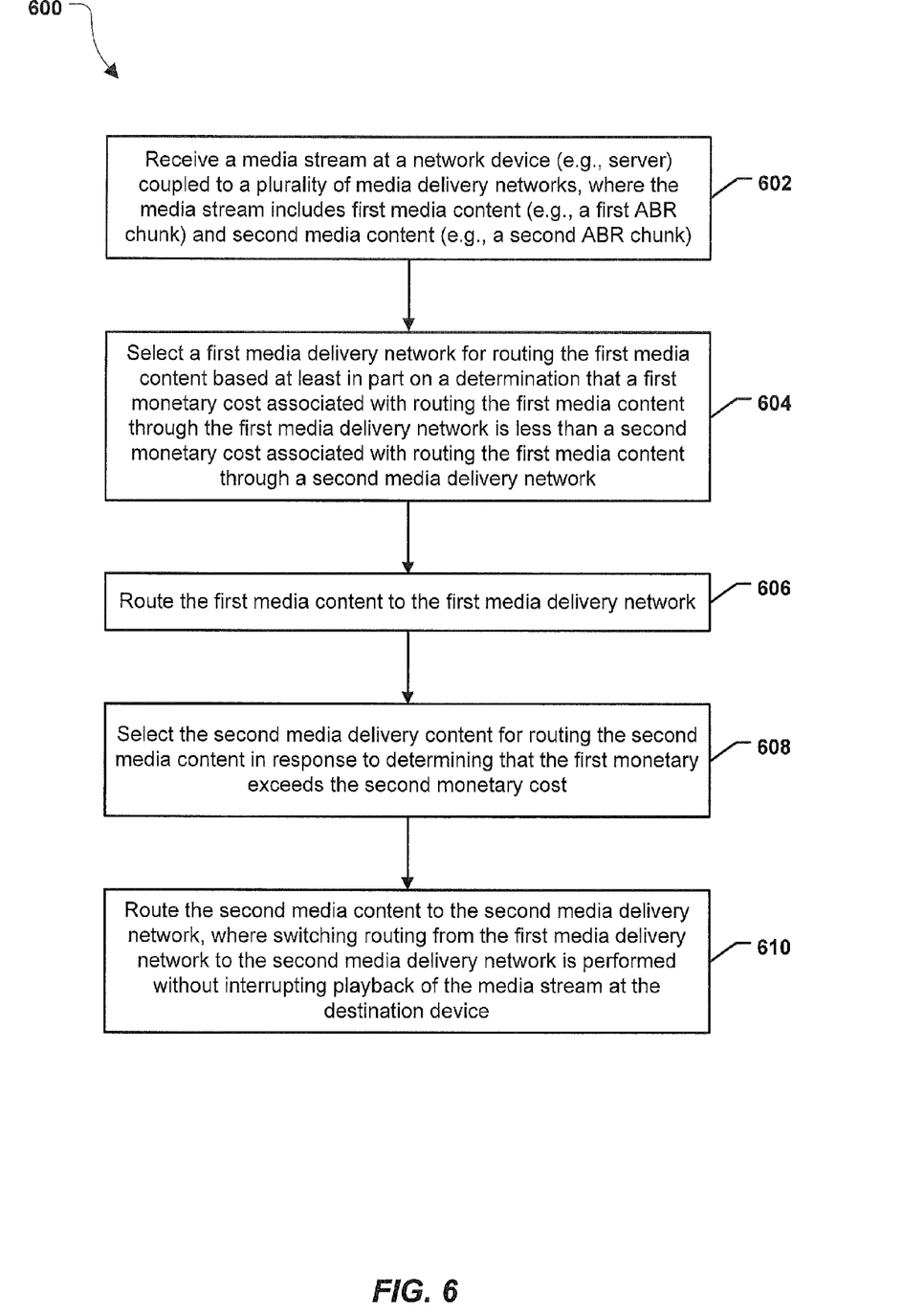
FIG. 6 is a diagram of an illustrative embodiment of a method of routing media content based on monetary cost.

FIG. 6 is a diagram of an illustrative embodiment of a method 600 of routing media content based on monetary cost. For example, the method 600 may be performed at the system 100 of FIG. 1 or the system 200 of FIG. 2. In an illustrative embodiment, the method 600 may be performed by the network device 120 of FIG. 1.

The method 600 may include receiving a media stream at a network device (e.g., server) coupled to a plurality of media delivery networks, at 602. The media stream may include first media content (e.g., a first ABR chunk) and second media content (e.g., a second ABR chunk). For example, in FIG. 1, the network device 120 may receive the media stream 110, which includes the first media content 111 (e.g., a first ABR chunk) and the second media content 112 (e.g., a second ABR chunk).

The method 600 may also include selecting a first media delivery network for routing the first media content, at 604, and routing the first media content to the first media delivery network, at 606. The selection may be based at least in part on a determination that a first monetary cost associated with routing the first media content through the first media delivery network is less than a second monetary cost associated with routing the first media content through a second media delivery network. For example, in FIG. 1, the network device 120 may select the first network 130 responsive to a determination by the rules engine 122 based on the routing criteria 124 that a monetary cost for the first network 130 is less than a monetary cost for the second network 140. The network device 120 may route the first media content 111 to the destination device via the selected first network 130.

The method 600 may further include selecting the second media delivery network for routing the second media content in response to determining that the first monetary exceeds the second monetary cost, at 608, and routing the second media content to the second media delivery network, at 610. For example, in FIG. 1, the network device 120 may route the second media content 112 through the second network 140. Advantageously, switching routing from the first media delivery network to the second media delivery network may be performed without interrupting playback of the media stream at the destination device. The method 600 of FIG. 6 may thus enable dynamic routing of a media stream at reduced monetary cost, including switching routing mid-stream without impacting user enjoyment of the media stream.

Figure 7:
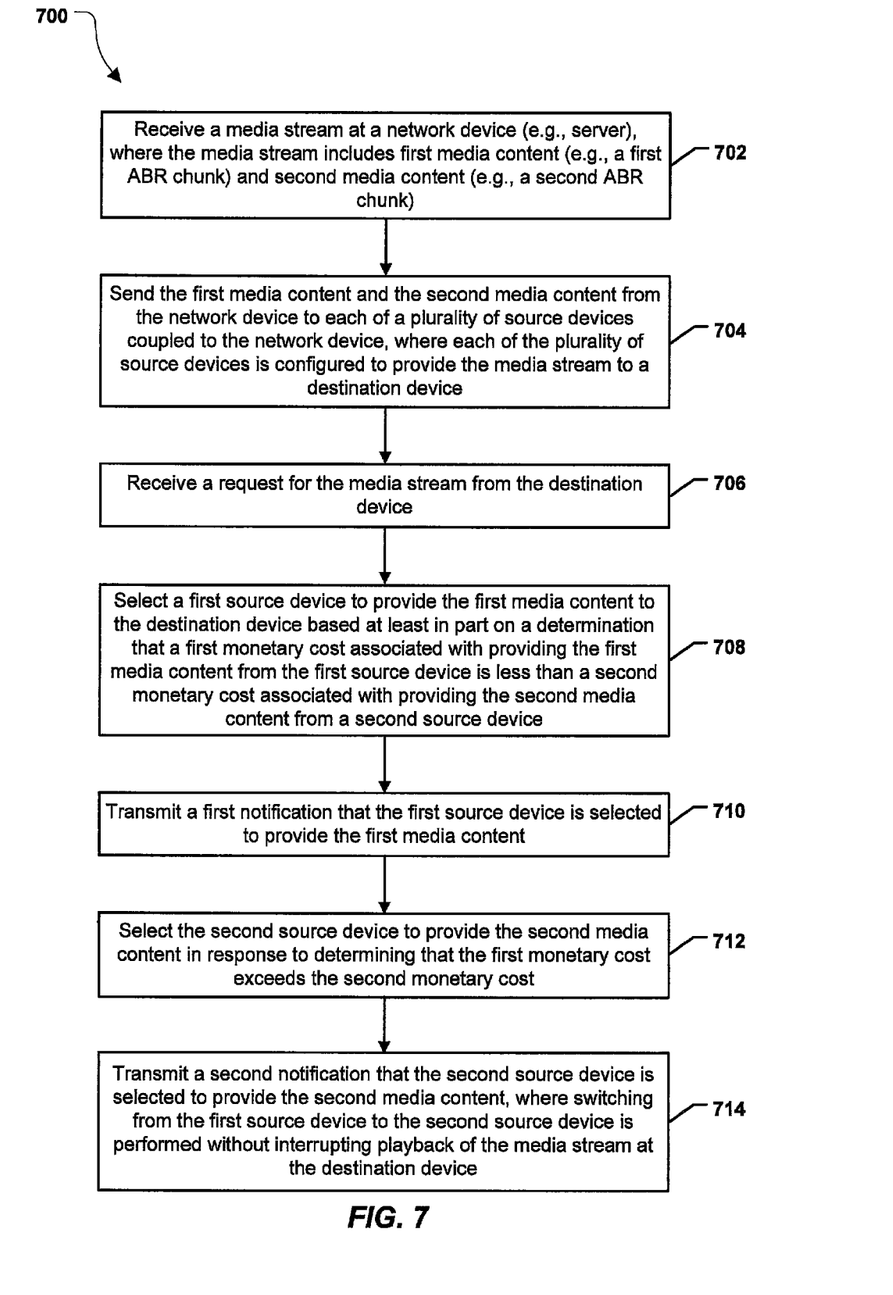
FIG. 7 is a diagram of an illustrative embodiment of a method of selecting a media content source based on monetary cost.

FIG. 7 is a diagram of an illustrative embodiment of a method 700 of selecting a media content source based on monetary cost. For example, the method 700 may be performed at the system 300 of FIG. 3 or the system 400 of FIG. 4.

The method 700 may include receiving a media stream at a network device (e.g., server), at 702. The media stream may include first media content (e.g., a first ABR chunk) and second media content (e.g., a second ABR chunk). For example, in FIG. 3, the network device 320 may receive the media stream 310, which includes the first media content 311 (e.g., a first ABR chunk) and the second media content 312 (e.g., a second ABR chunk).

The method 700 may also include sending the first media content and the second media content from the network device to each of a plurality of source devices coupled to the network device, at 704. Each of the plurality of source devices may be configured to provide the media stream to a destination device. For example, in FIG. 3, the network device 320 may send (e.g., syndicate) the media stream 310 to each of the source devices 332-336.

The method 700 may further include receiving a request for the media stream from the destination device, at 706. For example, in FIG. 3, the network device 320 may receive the request 361.

The method 700 may include selecting a first source device to provide the first media content to the destination device, at 708, and transmitting a first notification that the first source device is selected to provide the first media content, at 710. The selection may be based at least in part on a determination that a first monetary cost associated with providing the first media content from the first source device is less than a second monetary cost associated with providing the second media content from a second source device. For example, in FIG. 3, the network device 320 may select the first source device 332 responsive to a determination by the rules engine 322 based on the sourcing criteria 324, and may transmit the notification 362 and/or 364 that the first source device 332 has been selected.

The method 700 may also include selecting the second source device to provide the second media content in response to determining that the first monetary cost exceeds the second monetary cost, at 712, and transmitting a second notification that the second source device is selected to provide the second media content, at 714. For example, in FIG. 3, the network device 320 may select the second source device 334 to provide the second media content 312 and may send the notification 363 and/or 364 that the second source device 334 has been selected. Advantageously, switching from the first source device to the second source device is performed without interrupting playback of the media stream at the destination device. The method 700 may thus enable dynamic selection of a media source for a media stream at reduced monetary cost, including switching sources mid-stream without impacting user enjoyment of the media stream.

Figure 8:
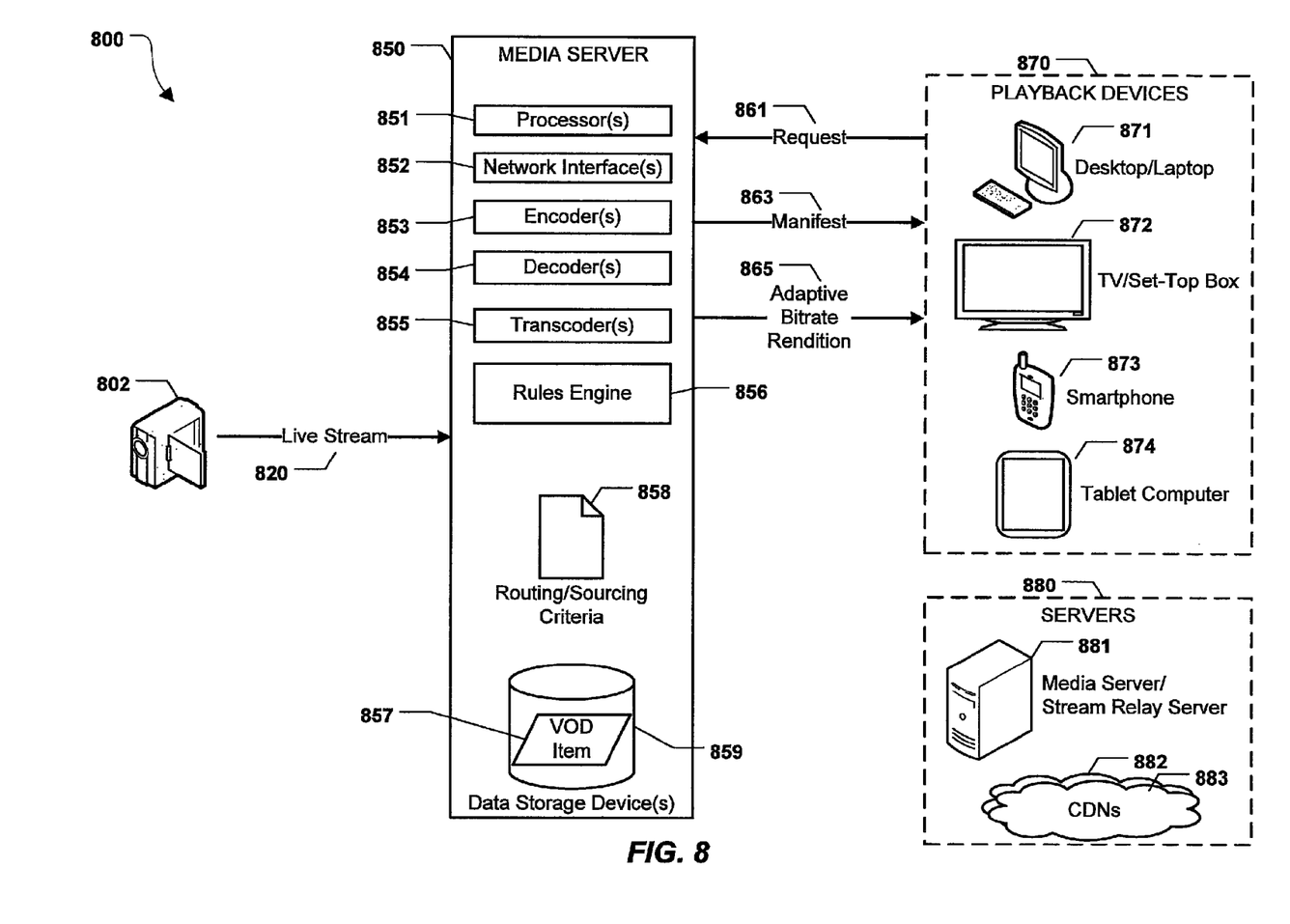
FIG. 8 is a diagram of a particular embodiment of a media server that is operable to route media content based on monetary cost and select a media content source based on monetary cost.

FIG. 8 is a diagram to illustrate a particular embodiment of a system 800 that is operable to route media content and select a media content source based on monetary cost. The system 800 includes a media server 850 that is configured to send data to and receive data from various other devices (e.g., via a network, such as a local area network (LAN) or the Internet). For example, the media server 850 may communicate with one or more playback devices 870 (e.g., devices that are configured to receiving streaming content) and one or more other servers/networks 880. In an illustrative embodiment, the media server 850 is the network device 120 of FIG. 1, the source device 202 of FIG. 2, one of the network devices 231, 232, 233, or 234 of FIG. 2, the network device 320 of FIG. 3, the source device 332, 334, or 336 of FIG. 3, the source device 430-436 of FIG. 4, or any combination thereof. It should be noted that the illustrated playback devices 870 are examples. The playback devices 870 may include additional client devices and/or other types of devices capable of requesting and playing media streams.

The media server 850 may include one or more processors 851 and various components that are executable by the processor(s) 851. The media server 850 may correspond to or include software application(s) that perform media serving or processing, hardware systems (e.g., servers) that support or perform media serving and processing, or any combination thereof. Thus, various operations described with reference to the media server 850, or components thereof, may be implemented using hardware, software (e.g., instructions executable by the processor(s) 851), or any combination thereof.

The media server 850 may include one or more network interfaces 852. For example, the network interface(s) 852 may include input interface(s) and output interface(s) that are configured to receive data and to send/route data (e.g., media streams or media content), respectively. In a particular embodiment, the network interface(s) 852 may be wired and/or wireless interfaces that enable the media server 850 to communicate data via a network, such as a media delivery network. For example, the network interface(s) 852 may include an Ethernet interface, a wireless interface compatible with an Institute of Electrical and Electronics Engineers (IEEE) 802.11 (e.g., Wi-Fi) protocol, or other wired or wireless interface.

The network interface(s) 852 may be configured to receive one or more media streams, such as an illustrative live media stream 820 from a capture source 802 (e.g., a camera). The live media stream 820 may include audio data, video data, text data, closed captioning (CC) data, and/or subtitle data. The network interface(s) 852 may also be configured to route/transmit data to the one or more of the playback devices 870 (e.g., a smartphone, a tablet computer, a laptop computer, a desktop computer, a set-top box, a television, a portable media player, a game console, etc.). In the embodiment of FIG. 8, the playback devices 870 include a desktop/laptop computing device 871, a television (TV)/set-top box 872, a smartphone 873, and a tablet computer 874. The network interface(s) 852 may further be configured to transmit data to the one or more other servers/networks 880 (e.g., a media server, a stream relay server, a content distribution network, an edge server, etc.). In the embodiment of FIG. 8, the other servers/networks 880 include a media server/stream relay server 881 and content distribution networks (CDNs) 882, 883. In a particular embodiment, data transmitted to the playback devices 870 and to the servers/networks 880 includes video streams. The video streams may be associated with the same encoding format and transmission protocol or may be associated with different encoding formats and transmission protocols. In a particular embodiment, generating the video streams includes performing video decoding, encoding, transcoding, and/or transmuxing operations at the media server 850 (e.g., to modify a video encoding format, an audio encoding format, a bitrate, an aspect ratio, packaging, etc. relative to the incoming video stream 820). In a transmuxing operation, encoded audio and video may be repackaged without modifying the encoded audio and video.

The media server 850 may include various components configured to perform stream processing functions. For example, the media server 850 may include one or more video processing components, such as encoder(s) 853, decoder(s) 854, and transcoder(s) 855, each of which may be implemented using hardware, software, or both. The decoder(s) 854 may decode data received by the media server 850. For example, the decoder(s) 854 may decode received streams (e.g., live audio-only, video-only, or audio-video streams). The encoder(s) 853 may encode data that is to be transmitted by the media server 850. The transcoder(s) 855 may be configured to perform bitrate conversion, CODEC conversion, frame size conversion, etc. Depending on a format of a received stream, a playback format supported by a requesting device, and/or transcoding parameters in use, a transcoding operation performed by the transcoder(s) 855 may trigger a decoding operation by the decoder(s) 854 and/or a re-encoding operation by the encoder(s) 853. In a particular embodiment, parameters used by the transcoder(s) 855 are stored in one or more transcoding templates at the media server 850. The encoder(s) 853, decoder(s) 854, and transcoder(s) 855 may thus enable the media server 850 to process data in accordance with multiple coding technologies and protocols.

For example, the media server 850 may support video encoding types including, but not limited to, H.264, on2® VP-based encoding (on2 is a registered trademark of Google Inc. of Mountain View, Calif.), Sorenson Spark® (Sorenson Spark is a registered trademark of Sorenson Media, Inc. of Salt Lake City, Utah), Screen video, Screen video 2, motion picture experts group (MPEG) 2 (MPEG-2), and MPEG-4 Part 2. The media server 850 may support audio encoding types including, but not limited to, advanced audio coding (AAC), AAC low complexity (AAC LC), AAC high efficiency (HE-AAC), G.711, MPEG Audio Layer 3 (MP3), Speex, Nellymoser Asao, and AC-3.

The media server 850 may support communication (e.g., adaptive streaming and non-adaptive streaming) protocols including, but not limited to, hypertext transfer protocol (HTTP) live streaming (HLS), HTTP dynamic streaming (HDS), smooth streaming, and MPEG dynamic adaptive streaming over HTTP (MPEG-DASH) (also known as international organization for standardization (ISO)/international electrotechnical commission (IEC) 23009-1). The media server 850 may also support real time messaging protocol (RTMP) (and variants thereof), real-time streaming protocol (RTSP), real-time transport protocol (RTP), and MPEG-2 transport stream (MPEG-TS). Additional audio formats, video formats, coder/decoders (CODECs), and/or protocols may also be supported.

The media server 850 may include one or more data storage devices 859 (e.g., random access memory (RAM), disk-based storage, etc.). The data storage device(s) 859 may store stream data (e.g., frames of a live video stream), files, closed caption data, images (e.g., to be overlaid on top of a video stream), and other data. In a particular embodiment, the data storage device(s) 859 store a video on demand (VOD) item 857. The VOD item 857 may include audio data, video data, text data, closed captioning (CC) data, and/or subtitle data. For example, the VOD item 857 may be a movie or a television show. Alternately, the VOD item 857 may be stored remote from the media server 850 and may be accessible by the media server 850 via a network (e.g., the Internet).

The media server 850 also includes a rules engine 856. In an illustrative embodiment, the rules engine 856 includes functions as described with reference to the rules engine 122 of FIG. 1, the rules engine 204 of FIG. 2, and/or the rules engine 322 of FIG. 3. The media server 850 also stores (or has access to) criteria 858 (e.g., the routing criteria 124 of FIG. 1, the routing criteria 206 of FIG. 2, the sourcing criteria 324 of FIG. 3, and/or the criteria 500 of FIG. 5).

In a particular embodiment, the media server 850 may support adaptive streaming. For example, the media server 850 may be configured to generate an adaptive streaming manifest 863. The manifest 863 may include information describing adaptive bitrate renditions that are available for adaptive streaming. To initiate an adaptive streaming session, a destination device (e.g., one of the playback devices 870) may request the manifest 863. Upon receiving the manifest 863, the destination device may determine which of the available renditions should be requested from the media server 850. For example, the destination device may make such a determination based on buffering/processing capability at the destination device and/or network conditions (e.g., bandwidth) being experienced by the destination device.

Upon determining which rendition should be requested, the destination device may transmit a request to the media server 850. The request may specify a particular portion (e.g., portion "X") of the requested rendition. The particular portion may be specified using start/end frame numbers, start/end times, a portion number/identifier, etc. Depending on the adaptive streaming protocol in use, the requested portion may correspond to a "chunk" of a rendition and/or a group of pictures (GOP). A "chunk" may refer to a fixed (e.g., ten seconds) or variable length duration of a stream rendition. A group of pictures may refer to a collection of video frames that includes one or more intra-coded frames (I-frames) and one or more additional frames that include difference information relative to the one or more I-frames (e.g., P-frame and/or B-frames). For example, in FIG. 1, the first media content 111 may correspond to a first chunk of the media stream 110 and the second media content 112 may correspond to a second, subsequent chunk of the media stream 110. As another example, in FIG. 3, the first media content 311 may correspond to a first chunk of the media stream 310 and the second media content 312 may correspond to a second, subsequent chunk of the media stream 310. If there are no problems with receipt and playback of the requested portion, the destination device may request a subsequent portion (e.g., portion "X+1") of the same rendition. However, if playback and/or network conditions become worse, the destination device may switch to a lower bitrate rendition by requesting subsequent portions of the lower bitrate rendition. Conversely, if playback and/or network conditions improve, the destination device may switch to a higher bitrate rendition. The media server 850 may generate key frame aligned portions for the adaptive streaming renditions, so that switching to a lower bitrate or higher bitrate rendition appears "seamless" (e.g., does not result in noticeable visual glitches or dropped frames).

During operation, the media server 850 may route media content based on monetary cost. For example, the media server 850 may receive a media request 861 from a playback device, such as the tablet computer 874. In response to the media request 861, the media server 850 may transmit an adaptive streaming manifest 863 associated with the live stream 820 or the VOD item 857 to the tablet computer 874. The tablet computer 874 may select a particular rendition 865 of the live video stream 820 from the manifest 863 and send the media server 850 a request for the selected rendition 865. The media server 850 may provide the requested rendition 865 to the tablet computer 874, as shown. In a particular embodiment, the media server 850 may provide the requested rendition 865 by routing the requested rendition 865 through one or more networks (e.g., the CDN 882 or the CDN 883) that are dynamically selected based on monetary cost. Alternately, the manifest 863 may include information directing the tablet computer 874 to request the rendition 865 from a specific network (e.g., the CDN 882 or the CDN 883), where the specific network is determined by the rules engine 856 to reduce/minimize routing costs.

Alternately, or in addition, the media server 850 may select a media content source based on monetary cost. For example, the media server 850 may receive and syndicate the live stream 820 to additional devices (e.g., devices of the CDNs 882, 883). The media server 850 may receive the media request 861 from a playback device, such as the tablet computer 874. In response to the media request 861, the media server 850 may transmit the adaptive streaming manifest 863 associated with the live stream 820 or the VOD item 857 to the tablet computer 874. The tablet computer 874 may select the particular rendition 865 of the live video stream 820 from the manifest 863 and send the media server 850 a request for the selected rendition 865. The media server 850 may provide the requested rendition 865 to the tablet computer 874, as shown. The media server 850 may select a particular source device (e.g., at the CDN 882 or the CDN 883) to provide the requested rendition 865 based on monetary cost, and the media server 850 may transmit a notification to the tablet computer 874 and/or the particular source device. In another embodiment, the manifest 863 may include information directing the tablet computer 874 to request the rendition 865 from a specific source device, where the specific source is determined by the rules engine 856 to reduce/minimize monetary cost.

It should be noted that the order of steps described with reference to FIGS. 1-8 is to be considered illustrative, not limiting. In alternate embodiments, the order of steps may be different. Further, one or more steps may be optional and/or replaced by other steps. In addition, one or more steps may be consolidated. In accordance with various embodiments of the present disclosure, one or more methods, functions, and modules described herein may be implemented by software programs executable by a computer system. Further, implementations can include distributed processing, component/object distributed processing, and/or parallel processing.

Particular embodiments can be implemented using a computer system executing a set of instructions that cause the computer system to perform any one or more of the methods or computer-based functions disclosed herein. A computer system may include a laptop computer, a desktop computer, a server computer, a mobile phone, a tablet computer, a set-top box, a media player, one or more other computing devices, or any combination thereof. The computer system may be connected, e.g., using a network, to other computer systems or peripheral devices. For example, the computer system or components thereof can include or be included within any one or more of the network device 120 of FIG. 1, the destination device 150 of FIG. 1, the source device 202 of FIG. 2, the destination device 250 of FIG. 2, the devices 230-235 of FIG. 2, the network device 320 of FIG. 3, the destination device 350 of FIG. 3, the source devices 332, 334, and 336 of FIG. 3, the source devices 430-436 of FIG. 4, the destination devices 450-452 of FIG. 4, the media server 850 of FIG. 8, the desktop/laptop computing device 871 of FIG. 8, the TV/set-top box 872 of FIG. 8, the smartphone 873 of FIG. 8, the tablet computer 874 of FIG. 8, the media server/stream relay server 881 of FIG. 8, a server (e.g., edge server) of the CDN 882 or the CDN 883 of FIG. 8, or any combination thereof.

In a networked deployment, the computer system may operate in the capacity of a server or as a client user computer in a server-client user network environment, or as a peer computer system in a peer-to-peer (or distributed) network environment. The term "system" can include any collection of systems or sub-systems that individually or jointly execute a set, or multiple sets, of instructions to perform one or more computer functions.

In a particular embodiment, the instructions can be embodied in a computer-readable or a processor-readable device. The terms "computer-readable device" and "processor-readable device" include a single storage device or multiple storage devices, such as a centralized or distributed database, and/or associated caches and servers that store one or more sets of instructions. The terms "computer-readable device" and "processor-readable device" also include any device that is capable of storing a set of instructions for execution by a processor or that cause a computer system to perform any one or more of the methods or operations disclosed herein. For example, a computer-readable or processor-readable device or storage device may include random access memory (RAM), flash memory, read-only memory (ROM), programmable read-only memory (PROM), erasable programmable read-only memory (EPROM), electrically erasable programmable read-only memory (EEPROM), registers, a hard disk, a removable disk, a disc-based memory (e.g., compact disc read-only memory (CD-ROM)), or any other form of storage device. A computer-readable or processor-readable device is not a signal.

As used herein, a "live" stream may differ from a "video on demand" (VOD) stream. A VOD stream originates from, or corresponds to, content that is available in its entirety at a stream source when a packet of the VOD stream is sent. For example, a VOD stream may correspond to a movie or television show that is stored at a storage device. A live stream corresponds to content that is not available in its entirety when a packet of the live stream is sent. For example, a live stream may be used to transmit audio and/or video content corresponding to an event as the event is being captured (e.g., in real-time or near-real time). Examples of such events may include, but are not limited to, in-progress sporting events, musical performances, video-conferences, and webcam feeds. It should be noted that a live stream may be delayed with respect to the event being captured (e.g., in accordance with government or industry regulations, such as delay regulations enforced by the Federal Communications Commission (FCC)).

In a particular embodiment, a method includes receiving media content at a network device. The method also includes sending the media content from the network device to each of a plurality of source devices coupled to the network device, where each of the plurality of source devices is configured to provide the media content to a destination device. The method further includes receiving a request for the media content from the destination device. The method includes selecting a first source device of the plurality of source devices to provide the media content to the destination device based at least in part on a determination that a first monetary cost associated with providing the media content from the first source device is less than a second monetary cost associated with providing the media content from a second source device of the plurality of source devices.

In another particular embodiment, an apparatus includes a processor and a network interface configured to receive media content. The network interface is also configured to send the media content to each of a plurality of devices configured to provide the media content to a destination device. The apparatus further includes a memory storing instructions executable by the processor to perform operations that include selecting a first device of the plurality of devices to provide the media content to the destination device based at least in part on a determination that a first monetary cost associated with providing the media content from the first device is less than a second monetary cost associated with providing the media content from a second device of the plurality of devices.

In another particular embodiment, a computer-readable storage device stores instructions that, when executed by a computer, cause the computer to perform operations including receiving a media stream at a particular device of a plurality of devices configured to provide the media stream to a destination device, where the media stream includes first media content and second media content. The operations also include sending the first media content and the second media content from the particular device to each other device of the plurality of devices. The operations further include receiving a request for the media stream from the destination device. The operations include selecting a first device of the plurality of devices to provide the first media content to the destination device based at least in part on a determination that a first monetary cost associated with providing the first media content from the first device is less than a second monetary cost associated with providing the first media content from a second device of the plurality of devices. The operations also include transmitting a first notification that the first device is selected to provide the first media content. The operations further include, after selecting the first device to provide the first media content, selecting the second device to provide the second media content to the destination device in response to determining that the first monetary cost exceeds the second monetary cost. The operations include transmitting a second notification that the second device is selected to provide the second media content. Switching from the first device to the second device is performed without interrupting playback of the media stream at the destination device.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
receiving media content at a network device, wherein the media content includes a first adaptive bitrate rendition (ABR) chunk and a second ABR chunk;
sending the media content from the network device to each of a plurality of source devices;
receiving, at the network device, a request for the media content from a destination device distinct from the network device;
determining at a first time, by the network device based on pricing tier data stored in a database, a file, or a combination thereof, that a first monetary cost associated with providing the media content from a first source device is less than a second monetary cost associated with providing the media content from a second source device, wherein the pricing tier data indicates a monetary cost associated with serving data from each of the plurality of source devices, and wherein the pricing tier data indicates variation in price based on an amount of data routed through a first network that includes the first source device, an amount of data routed through a second network that includes the second source device, a time of day, or any combination thereof;
in response to determining at the first time that the first monetary cost is less than the second monetary cost, sending by the network device a first notification that the first source device is to provide the first ABR chunk of the media content to the destination device;
after sending the first notification, determining at a second time, by the network device based on the pricing tier data, that the first monetary cost exceeds the second monetary cost; and
in response to determining at the second time that the first monetary cost exceeds the second monetary cost, sending by the network device a second notification that the second source device is to provide the second ABR chunk of the media content to the destination device.

2. The method of claim 1, wherein the first ABR chunk and the second ABR chunk are part of a media stream and wherein the media stream is deliverable to the destination device such that the destination device is operable to receive the second ABR chunk from the second source device after receiving the first ABR chunk from the first source device without interruption of playback of the media stream at the destination device.

3. The method of claim 1, wherein the first notification is transmitted by the network device to the destination device to cause the destination device to request the media content from the first source device, and wherein the second notification is transmitted by the network device to the destination device to cause the destination device to request the media content from the second source device.

4. The method of claim 1, wherein the first notification is transmitted by the network device to the first source device to cause the first source device to provide the first ABR chunk of the media content to the destination device, and wherein the second notification is transmitted by the network device to the second source device to cause the second source device to provide the second ABR chunk of the media content to the destination device.

5. The method of claim 1, wherein the first source device is part of a first media delivery network and wherein the second source device is part of a second media delivery network.

6. The method of claim 1, wherein the first source device and the second source device are associated with a common service provider.

7. The method of claim 1, wherein the network device is a source device that sends particular media content to the destination device.

8. The method of claim 1, wherein at least one of the plurality of source devices is part of an internet hosting service, a content delivery network, a cloud service provider, an internet service provider, a wireless service provider, or any combination thereof.

9. The method of claim 1, wherein the media content includes video content, audio content, graphics content, text content, or any combination thereof.

10. The method of claim 1, wherein the media content is received from a storage device of the network device.

11. The method of claim 1, wherein the media content is received from another network device.

12. The method of claim 1, wherein the pricing tier data stored at the network device further indicates an individual connection bandwidth supported by a particular media delivery network, and wherein a media delivery network other than the particular media delivery network and having a higher monetary cost than the particular media delivery network is selected to provide the media content to a particular destination device when the individual connection bandwidth is less than a bandwidth of the media content.

13. The method of claim 1, wherein the pricing tier data further indicates variation in price based on a connection duration.

14. The method of claim 1, wherein:
the pricing tier data further indicates variation in price based on plurality of simultaneous connection groups that are supported by a particular source device, a particular network, or a combination thereof;
each group of the plurality of simultaneous connection groups corresponds to a particular number of simultaneous connections and a particular monetary cost; and
a first group of the plurality of simultaneous connection groups has a lower monetary cost than a next group of the plurality of simultaneous connection groups.

15. A non-transitory computer-readable storage device storing instructions that, when executed by a computer, cause the computer to perform operations comprising:
receiving media content at a particular device of a plurality of devices, wherein the media content includes a first adaptive bitrate rendition (ABR) chunk and a second ABR chunk;
sending the first ABR chunk and the second ABR chunk from the particular device to each other device of the plurality of devices;
receiving a request for the media content from a destination device distinct from the particular device;
determining at a first time, based on pricing tier data stored in a database, a file, or a combination thereof, that a first monetary cost associated with providing the media content from a first device of the plurality of devices is less than a second monetary cost associated with providing the media content from a second device of the plurality of devices, wherein the pricing tier data indicates a monetary cost associated with serving data from each of the plurality of devices, and wherein the pricing tier data indicates variation in price based on an amount of data routed through a first network that includes the first device, an amount of data routed through a second network that includes the second device, a time of day, or any combination thereof;
in response to determining at the first time that the first monetary cost is less than the second monetary cost, transmitting a first notification to the destination device to cause the destination device to request the first ABR chunk from the first device;
after sending the first notification, determining at a second time based on the pricing tier data that the first monetary cost exceeds the second monetary cost; and
in response to determining at the second time that the first monetary cost exceeds the second monetary cost, transmitting a second notification to the destination device to cause the destination device to request the second ABR chunk from the second device, wherein the first ABR chunk and the second ABR chunk are part of a media stream and wherein the media stream is deliverable to the destination device such that the destination device is operable to receive the second ABR chunk from the second device after receiving the first ABR chunk from the first device without interruption of playback of the media stream at the destination device.

16. A method comprising:
receiving media content at a network device;
sending the media content from the network device to each of a plurality of source devices;
receiving, at the network device, a request for the media content from a destination device distinct from the network device;
determining, by the network device based on pricing tier data stored in a database, a file, or a combination thereof, that a first monetary cost associated with providing the media content from a first source device of the plurality of source devices is less than a second monetary cost associated with providing the media content from a second source device of the plurality of source devices, wherein the pricing tier data indicates variation in price based on plurality of simultaneous connection groups, an amount of data routed through a first network that includes the first source device, an amount of data routed through a second network that includes the second source device, a time of day, or any combination thereof, and wherein the pricing tier data indicates a monetary cost associated with serving data from the each of the plurality of source devices; and
in response to determining that the first monetary cost is less than the second monetary cost, sending by the network device a notification that the first source device is to provide the media content to the destination device.

17. The method of claim 16, wherein:
the plurality of simultaneous connection groups are supported by a particular source device, a particular network, or a combination thereof;
each group of the plurality of simultaneous connection groups corresponds to a particular number of simultaneous connections and a particular monetary cost; and
a first group of the plurality of simultaneous connection groups has a lower monetary cost than a next group of the plurality of simultaneous connection groups.

* * * * *